United States Patent
Jung et al.

(10) Patent No.: US 10,226,751 B2
(45) Date of Patent: Mar. 12, 2019

(54) CORE MATERIAL FOR VACUUM INSULATION PANEL INCLUDING POROUS ALUMINOSILICATE, AND VACUUM INSULATION PANEL PROVIDED WITH THE SAME

(71) Applicant: LG CHEM, LTD., Seoul (KR)

(72) Inventors: Sang Yun Jung, Daejeon (KR); Cheol-Hee Park, Daejeon (KR); Shin Hee Jun, Daejeon (KR); Won Bae Byun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/514,318

(22) PCT Filed: Oct. 15, 2015

(86) PCT No.: PCT/KR2015/010914
§ 371 (c)(1),
(2) Date: Mar. 24, 2017

(87) PCT Pub. No.: WO2016/064138
PCT Pub. Date: Apr. 28, 2016

(65) Prior Publication Data
US 2017/0297001 A1    Oct. 19, 2017

(30) Foreign Application Priority Data

Oct. 20, 2014  (KR) .................. 10-2014-0142002
Oct. 12, 2015  (KR) .................. 10-2015-0142296

(51) Int. Cl.
*B01J 20/16*    (2006.01)
*F16L 59/04*    (2006.01)
(Continued)

(52) U.S. Cl.
CPC .......... *B01J 20/16* (2013.01); *B01J 20/2808* (2013.01); *B01J 20/28061* (2013.01);
(Continued)

(58) Field of Classification Search
CPC ...................................................... B01J 20/16
(Continued)

(56) References Cited

U.S. PATENT DOCUMENTS 7,767,004 B2    8/2010  Sayari et al.
2004/0253406 A1  12/2004  Hayashi et al.
(Continued)

FOREIGN PATENT DOCUMENTS

AT          12777         11/2012
DE      202004017115      3/2006
(Continued)

OTHER PUBLICATIONS

Wang et al., "Shape-controlled synthesis of monolithic ZSM-5 zeolite with hierarchical structure and mechanical stability," Microporous and Mesoporous Materials 132: 428-434 (2010).
(Continued)

*Primary Examiner* — Brent T O'Hern
(74) *Attorney, Agent, or Firm* — Dentons US LLP

(57) ABSTRACT

Provided are a core material for a vacuum insulation panel including porous aluminosilicate, and a vacuum insulation panel provided with the same. The core material for the vacuum insulation panel according to the present disclosure has superior long-term durability and improved gas adsorption ability (particularly, superior water absorption ability) while requiring a low raw material cost. The vacuum insulation panel including the core material may exhibit more improved insulation performance by minimizing a reduction in the vacuum degree without an additional getter or absorbent.

4 Claims, 1 Drawing Sheet

(51) Int. Cl.

| | | |
|---|---|---|
| *B01J 20/28* | (2006.01) | |
| *B01J 20/30* | (2006.01) | |
| *E04B 1/80* | (2006.01) | |
| *F16L 59/065* | (2006.01) | |
| *B32B 15/08* | (2006.01) | |
| *C04B 28/00* | (2006.01) | |
| *C04B 18/02* | (2006.01) | |
| *B32B 7/12* | (2006.01) | |
| *B32B 9/00* | (2006.01) | |
| *B32B 9/04* | (2006.01) | |
| *B32B 15/082* | (2006.01) | |
| *B32B 15/088* | (2006.01) | |
| *B32B 15/09* | (2006.01) | |
| *B32B 27/30* | (2006.01) | |
| *B32B 27/34* | (2006.01) | |
| *B32B 27/36* | (2006.01) | |

(52) U.S. Cl.
CPC ... *B01J 20/28083* (2013.01); *B01J 20/28092* (2013.01); *B01J 20/3085* (2013.01); *B32B 7/12* (2013.01); *B32B 9/005* (2013.01); *B32B 9/041* (2013.01); *B32B 15/08* (2013.01); *B32B 15/082* (2013.01); *B32B 15/088* (2013.01); *B32B 15/09* (2013.01); *B32B 27/30* (2013.01); *B32B 27/304* (2013.01); *B32B 27/34* (2013.01); *B32B 27/36* (2013.01); *C04B 18/027* (2013.01); *C04B 28/006* (2013.01); *E04B 1/803* (2013.01); *F16L 59/04* (2013.01); *F16L 59/065* (2013.01); *B32B 2250/03* (2013.01); *B32B 2307/304* (2013.01); *B32B 2307/724* (2013.01); *B32B 2307/726* (2013.01); *B32B 2419/00* (2013.01); *Y02P 40/165* (2015.11)

(58) Field of Classification Search
USPC .......................................................... 428/69
See application file for complete search history.

(56) References Cited

U.S. PATENT DOCUMENTS

| | | |
|---|---|---|
| 2006/0269472 A1 | 11/2006 | Mackinnon et al. |
| 2009/0179541 A1* | 7/2009 | Smith ............... B29C 63/02 312/406 |
| 2011/0030892 A1 | 2/2011 | Yamada et al. |
| 2011/0189070 A1 | 8/2011 | Suzuki et al. |
| 2012/0018349 A1 | 1/2012 | Van Donk et al. |
| 2012/0027673 A1 | 2/2012 | Larsen et al. |
| 2013/0052126 A1 | 2/2013 | Wang |
| 2013/0055924 A1 | 3/2013 | Seo et al. |
| 2014/0249344 A1 | 9/2014 | Minoux et al. |

FOREIGN PATENT DOCUMENTS

| | | |
|---|---|---|
| DE | 212010000208 | 4/2013 |
| FR | 2940265 | 6/2010 |
| JP | 2001108187 | 4/2001 |
| JP | 2001340755 | 12/2001 |
| JP | 2004339018 A | 12/2004 |
| JP | 2006167572 | 6/2006 |
| JP | 2010215434 A | 9/2010 |
| JP | 2011005446 A | 1/2011 |
| JP | 4941313 B2 | 5/2012 |
| JP | 2012513359 | 6/2012 |
| JP | 2013047166 | 3/2013 |
| JP | 2014113524 A | 6/2014 |
| JP | 2014139124 A | 7/2014 |
| KR | 10-0109609 B1 | 12/1996 |
| KR | 1999-0030923 A | 11/1999 |
| KR | 100746989 B1 | 8/2007 |
| KR | 10-2008-0103670 A | 11/2008 |
| KR | 101037143 B1 | 5/2011 |
| KR | 10-2011-0077860 A | 7/2011 |
| KR | 10-2011-0108140 A | 10/2011 |
| KR | 10-2013-0095299 A | 8/2013 |
| KR | 10-2014-0080737 A | 7/2014 |
| KR | 20140095510 A | 8/2014 |
| KR | 10-2017-0006951 | 1/2017 |
| KR | 10-2017-0015190 | 2/2017 |
| WO | 2004014798 | 2/2004 |
| WO | 2010026975 | 3/2010 |
| WO | 2013044016 A2 | 3/2013 |
| WO | 2013060719 | 5/2013 |
| WO | 2013148843 | 10/2013 |

OTHER PUBLICATIONS

Liu et al., "Steam-Stable Aluminosilicate Mesostructures Assembled from Zeolite Type Y Seeds," J. Am. Chem. Soc 122: 8791-8792 (2000).
"Mesoporosity development in ZSM-5 zeolite upon optimized desilication conditions in alkaline medium"; Groen, et al.; Colloids and Surfaces A: Physicochem. Eng. Aspects 241 (2004) 53-58.
"A micro/mesoporous aluminosilicate: key factors affecting framework crystallization during steam-assisted synthesis and its catalytic property"; Zhou, et al.; J. Mater. Chem., 2010, 20, 6764-6771.
"The effect of pore structure of zeolite on the adsorption of VOCs and their desorption properties by microwave heating"; Kim, et al.; Microporous and Mesoporous Materials (2011), doi: 10.1016/i.micromeso.2011.11.051.

* cited by examiner

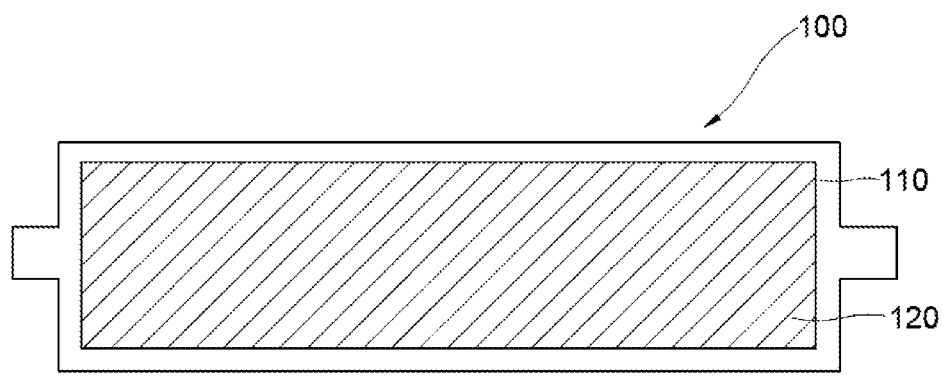

CORE MATERIAL FOR VACUUM INSULATION PANEL INCLUDING POROUS ALUMINOSILICATE, AND VACUUM INSULATION PANEL PROVIDED WITH THE SAME

CROSS-REFERENCE TO RELATED APPLICATION

This application is a National Stage Entry of International Application No. PCT/KR2015/010914, filed on Oct. 15, 2015, and claims the benefit of and priority to Korean Application No. 10-2014-0142002, filed on Oct. 20, 2014, and Korean Application No. 10-2015-0142296, filed on Oct. 12, 2015 all of which are hereby incorporated by reference in their entirety for all purposes as if fully set forth herein.

TECHNICAL FIELD

The present disclosure relates to a core material for a vacuum insulation panel including porous aluminosilicate, and a vacuum insulation panel provided with the same.

BACKGROUND OF ART

A commercially available vacuum insulation panel, as disclosed in, for example, Korean Patent Laid-open Publication No. 2011-0077860 (Jul. 7, 2011), includes a core material for maintaining a shape of an insulation material while supporting a difference between an internal pressure and an external pressure of the insulation material, an outer shell material for maintaining the insulation material under vacuum while covering the core material, and a getter for adsorbing residual gas in the insulation material and other gases penetrating from the outside to maintain vacuum for a long time. The vacuum insulation panel is manufactured in various sizes and shapes, and is mainly used in the fields of architecture and electronics.

Glass fiber wool which is used as the core material in existing vacuum insulation panels is manufactured through a thermal compression process by collecting bulky glass fiber, and is used to secure insulation performance of about 0.45 W/mK. However, when glass fiber wool is used for a long time, thermal conductivity is increased due to gas passing through the outer shell material, thereby generating a problem of deterioration of long-term durability. To ameliorate this problem, there have been attempts to secure long-term durability by applying glass fiber board as the core material. However, the glass fiber board has a limit in that initial insulation performance is relatively low.

Since the vacuum insulation panel using glass fiber as the core material has poor long-term durability or initial insulation performance, there is a problem that it is difficult to secure a long lifespan as a construction material and reliability of electronic products. In addition, the vacuum insulation panel using glass fiber has drawbacks of high manufacturing cost and inferior molding properties.

The getter also has many limitations in that it requires high-cost raw materials and high-temperature heat treatment (e.g., 300° C. or higher) for activation before use thereof, or it additionally includes an adsorbent for absorption of moisture.

DETAILED DESCRIPTION OF THE INVENTION

Technical Problem

The present disclosure is intended to provide a core material for a vacuum insulation panel, which has more improved gas adsorption ability to exhibit excellent insulation performance.

Further, the present disclosure is intended to provide a vacuum insulation panel provided with the core material.

Technical Solution

According to the present disclosure, a core material for a vacuum insulation panel is provided, including porous aluminosilicate having an argon adsorption Brunauer-Emmett-Teller (BET) surface area of 300 m²/g or more and an external specific surface area (ESA) of 150 m²/g or more.

According to the present disclosure, the porous aluminosilicate may have a Barrett-Joyner-Halenda (BJH) desorption average pore width of 5 to 15 nm.

According to the present disclosure, the porous aluminosilicate may have pores satisfying the following Equation 1:

$$V_{meso}/V_{micro} > 3.0 \quad \text{[Equation 1]}$$

wherein $V_{meso}$ represents a Barrett-Joyner-Halenda (BJH) cumulative volume of mesopores having a pore size of 2 nm to 300 nm, and $V_{micro}$ represents a volume of micropores having a pore size of less than 2 nm, as calculated from argon adsorption Brunauer-Emmett-Teller (BET) surface area by the t-plot method.

According to the present disclosure, the porous aluminosilicate has a water absorption rate of 18% by weight or more, 22% by weight or more, and 25% by weight or more, when humidified at relative humidity of 80%, 90%, and 95% under an isothermal condition of 25° C., respectively.

According to the present disclosure, a vacuum insulation panel including the core material and an outer shell material sealing and covering the core material is provided.

Hereinafter, a core material for a vacuum insulation panel and a vacuum insulation panel provided with the same according to embodiments of the present disclosure will be described.

Prior to this, unless otherwise specified throughout this specification, the terminology used herein is only for the purpose of describing exemplary embodiments and is not intended to limit the present disclosure.

Singular forms used herein may be intended to include plural forms as well, unless the context clearly indicates otherwise.

It will be further understood that the term 'include', when used in this specification, specifies the presence of stated features, regions, integers, steps, operations, elements, or components, but does not preclude the addition of other features, regions, integers, steps, operations, elements, or components.

I. Core Material for Vacuum Insulation Panel

According to an aspect of the present disclosure, a core material for a vacuum insulation panel, including porous aluminosilicate having an argon adsorption Brunauer-Emmett-Teller (BET) surface area of 300 m²/g or more and an external specific surface area (ESA) of 150 m²/g or more is provided.

As a result of continuous experiments conducted by the present inventors, it was surprisingly confirmed that porous aluminosilicate satisfying the above physical properties may reduce an increase of thermal conductivity at an increased pressure and have chemical stability against water, thereby being appropriately used as a core material for a vacuum insulation panel. In general, thermal conductivity of the vacuum insulation panel increases over time, and in particular, the vacuum insulation material including the core material according to an embodiment of the present disclosure may exhibit a minimal increase in thermal conductivity when used.

As the core material according to an embodiment of the present disclosure is composed of inorganic porous aluminosilicate, the cost of the raw material is low while showing superior long-term durability. In addition, the core material according to an embodiment of the present disclosure has improved gas adsorption ability (particularly, superior water absorption ability). Furthermore, the core material has superior chemical and thermal stability, and therefore, the core material may substantially generate no gas and effectively adsorb other gases penetrating from the outside through the outer shell material.

Even if a small amount of water penetrates a space sealed by the outer shell material, it may instantaneously cause very high relative humidity (e.g., relative humidity of 80% or higher). However, the core material according to an embodiment of the present disclosure has improved gas adsorption ability (particularly, superior water absorption ability) to efficiently adsorb gas penetrating from the outside, thereby minimizing a reduction in the vacuum degree. Accordingly, more improved and stable insulation performance may be achieved.

This effect may be achieved by applying the porous aluminosilicate satisfying the physical properties according to embodiments of the present disclosure to the core material.

That is, as a result of continuous experiments conducted by the present inventors, it was confirmed that a significant difference in physical properties of the core material for the vacuum insulation panel may occur depending on a specific surface area, an average pore width, a volume ratio of mesopores and micropores, etc., of the porous aluminosilicate. The significant difference in the physical properties may cause a great difference in long-term durability and insulation performance of the vacuum insulation panel. Furthermore, a reduction in the vacuum degree may be minimized by using the core material without an additional getter or absorbent, and therefore a structure and a manufacturing process of the vacuum insulation panel may be simplified.

According to embodiments of the present disclosure, the core material for the insulation material includes porous aluminosilicate having an argon adsorption Brunauer-Emmett-Teller (BET) surface area of 300 m$^2$/g or more and an external specific surface area (ESA) of 150 m$^2$/g or more.

Since the porous aluminosilicate used as the core material has an argon adsorption Brunauer-Emmett-Teller (BET) surface area of 300 m$^2$/g or more and an external specific surface area (ESA) of 150 m$^2$/g or more, it is possible to secure structural stability of the core material and long-term durability and also to secure minimized thermal conductivity and stable insulation performance.

Here, the external specific surface area (ESA) of the porous aluminosilicate may be estimated from gas sorption experiments as a difference between the Brunauer-Emmett-Teller (BET) surface area of the porous aluminosilicate and the specific surface area from micropores. The micropore is a pore having a pore size of less than 2 nm, and the specific surface area from the micropore may be estimated, for example, from the t-plot method.

Preferably, it may be more advantageous in terms of achieving the above-described effects for the porous aluminosilicate to have an argon adsorption Brunauer-Emmett-Teller (BET) surface area of 300 m$^2$/g to 700 m$^2$/g, 300 m$^2$/g to 650 m$^2$/g, 350 m$^2$/g to 650 m$^2$/g, 350 m$^2$/g to 600 m$^2$/g, or 350 m$^2$/g to 550 m$^2$/g, and an external specific surface area (ESA) of 150 m$^2$/g or more, 150 m$^2$/g to 300 m$^2$/g, 150 m$^2$/g to 250 m$^2$/g, or 200 m$^2$/g to 250 m$^2$/g.

That is, when the porous aluminosilicate has an argon adsorption Brunauer-Emmett-Teller (BET) surface area of less than 300 m$^2$/g or an external specific surface area (ESA) of less than 150 m$^2$/g, it may exhibit a poor water absorption rate of less than 20% by weight under an isothermal condition of 25° C. and relative humidity of 80% or higher, and therefore this porous aluminosilicate is not suitable as the core material for the vacuum insulation panel.

According to an embodiment of the present disclosure, it may be more advantageous in terms of achieving the above-described effects for the porous aluminosilicate to have a Barrett-Joyner-Halenda (BJH) desorption average pore width of 5 nm to 15 nm, 6 nm to 14 nm, or 6 to 12 nm.

Furthermore, according to an embodiment of the present disclosure, the porous aluminosilicate may have pores satisfying the following Equation 1:

$$V_{meso}/V_{micro} > 3.0 \qquad \text{[Equation 1]}$$

wherein $V_{meso}$ represents a Barrett-Joyner-Halenda (BJH) cumulative volume of a mesopore having a pore size of 2 nm to 300 nm, and $V_{micro}$ represents a volume of a micropore having a pore size of less than 2 nm, as calculated from argon adsorption Brunauer-Emmett-Teller (BET) surface area by the t-plot method.

That is, porous aluminosilicate having a $V_{meso}/V_{micro}$ value of more than 3, preferably, 3.1 or more, or 3.1 to 5.0, 3.1 to 4.7, or 3.5 to 4.7, may exhibit more improved gas adsorption ability.

Commercially available zeolite (e.g., zeolite 13X available from Sigma-Aldrich, etc.) has a maximum water absorption rate of only about 20% by weight, and becomes saturated under humid and isothermal environments.

In contrast, the porous aluminosilicate having structural characteristics satisfying the above-described conditions according to embodiments of the present disclosure may exhibit a high absorption rate exceeding 30% by weight, particularly at high relative humidity.

For example, the porous aluminosilicate according to embodiments of the present disclosure may exhibit a water absorption rate of 18% by weight or more, and preferably 18% by weight to 25% by weight, when humidified at a relative humidity of 80% under an isothermal condition of 25° C.

Further, the porous aluminosilicate according to embodiments of the present disclosure may exhibit a water absorption rate of 22% by weight or more, and preferably 22% by weight to 27% by weight, when humidified at a relative humidity of 90% under an isothermal condition of 25° C.

In addition, the porous aluminosilicate according to embodiments of the present disclosure may exhibit a water absorption rate of 25% by weight or more, and preferably 25% by weight to 35% by weight, when humidified at a relative humidity of 95% under an isothermal condition of 25° C.

Accordingly, the vacuum insulation panel including the porous aluminosilicate as the core material may effectively adsorb residual gas in the insulation material and other gases penetrating from the outside through the outer shell material, and therefore it may exhibit a minimized reduction in the vacuum degree and stable insulation performance even when used for a long time.

The porous aluminosilicate having structural characteristics satisfying the above-described conditions may be prepared by a variety of methods, and preferably, the porous aluminosilicate may be prepared by coupled alkali-mediated dissolution and precipitation reactions of porous aluminosilicate precursors in an aqueous medium.

In this regard, as a silicon source, fumed silica, silicate, aluminosilicate, clays, minerals, metakaolin, activated clays, fly ash, slag, pozzolan, etc. may be used. As an aluminum source, alumina, aluminates, aluminum salts, clays, metakaolin, activated clays, fly ash, slag, pozzolan, etc. may be used.

As a non-limiting example, the porous aluminosilicate according to embodiments of the present disclosure may be prepared by a method including: i) forming a geopolymer resin satisfying a particular metal atomic ratio (e.g., Na:Al:Si=3:1:2) by adding a silicon source, an aluminum source, and water to a basic or alkaline solution (e.g., a sodium hydroxide solution) under stirring; ii) heat-treating the geopolymer resin at a low temperature (e.g., 60° C. to 80° C.) under atmospheric pressure; and iii) neutralizing the heat-treated geopolymer resin by washing.

Particularly, according to embodiments of the present disclosure, the porous aluminosilicate having gas adsorption ability (particularly, superior water absorption ability) may be obtained by heat treatment of the geopolymer resin satisfying a particular metal atomic ratio under conditions of atmospheric pressure and low temperature (e.g., 60° C. to 80° C., preferably 65° C. to 75° C.).

II. Vacuum Insulation Panel

According to another aspect of the present disclosure, a vacuum insulation panel including the above-described core material and an outer shell material sealing and covering the core material is provided.

FIG. 1 is a schematic illustration showing a vacuum insulation panel 100 according to an embodiment of the present disclosure. In the vacuum insulation panel 100, a core material 120 includes porous aluminosilicate having an argon adsorption Brunauer-Emmett-Teller (BET) surface area of 300 $m^2/g$ or more and an external specific surface area (ESA) of 150 $m^2/g$ or more. An outer shell material 110 is provided to seal and cover the core material 120.

In the existing vacuum insulation panel, a getter or an absorbent for adsorbing residual gas in the insulation material and other gases penetrating from the outside is generally provided inside the core material.

However, the vacuum insulation panel according to embodiments of the present disclosure includes the above-described porous aluminosilicate having long-term durability and improved gas adsorption ability as the core material, thereby minimizing a reduction in the vacuum degree without an additional getter or absorbent. Accordingly, the vacuum insulation panel may exhibit improved insulation performance even with a more simplified structure.

According to embodiments of the present disclosure, the outer shell material 110 may be a laminate having a gas barrier property. For example, the outer shell material 110 may be a laminate in which an adhesive layer, a barrier layer, and a surface protective layer are sequentially laminated.

The adhesive layer is a layer fused through heat sealing. As examples, a heat-fusible resin such as high-density polyethylene, low-density polyethylene, linear low-density polyethylene, cast polypropylene, oriented polypropylene, polyvinylidene chloride, polyvinyl chloride, ethylene-vinyl acetate copolymers, ethylene-vinyl alcohol copolymers, etc. may be applied to the adhesive layer.

The barrier layer which is a layer for blocking gas penetrating from the outside and protecting the core material may be a thin metal film having a thickness of about 5 μm to about 10 μm. A material of the barrier layer is not particularly limited, and is exemplified by an aluminum thin film.

The surface protective layer which is a layer for preventing cracking on the barrier layer made of a metal material may be a plastic film having a thickness of about 10 μm to about 15 μm. A material of the surface protective layer is not particularly limited, and is exemplified by a polyethylene terephthalate film, a polyvinylidene chloride film, a nylon film, other vinyl-based resin films, etc.

Meanwhile, according to embodiments of the present disclosure, the vacuum insulation panel may be manufactured by placing the core material between two outer shell materials, followed by thermal compression in a chamber under reduced pressure.

Advantageous Effects

A core material for a vacuum insulation panel according to the present disclosure has superior long-term durability and improved gas adsorption ability (particularly, superior water absorption ability) while requiring a low raw material cost. A vacuum insulation panel including the core material may exhibit more improved insulation performance by minimizing a reduction in the vacuum degree without an additional getter or absorbent.

BRIEF DESCRIPTION OF THE DRAWING

FIG. 1 is a schematic cross-sectional view of a vacuum insulation panel according to an embodiment of the present disclosure.

DETAILED DESCRIPTION OF THE EMBODIMENTS

Hereinafter, preferred examples are provided for better understanding. However, these examples are for illustrative purposes only, and the invention is not intended to be limited by these examples.

Example 1

3.02 g of NaOH was introduced into a reactor, and then 5.43 g of triple distilled water was added thereto and mixed well. To this solution, 7.76 g of sodium silicate (~10.6% $Na_2O$, ~26.5% $SiO_2$) was added and completely dissolved under stirring at 800 rpm at room temperature. To this prepared solution, 3.8 g of metakaolin was added and stirred at 800 rpm at room temperature for 40 minutes to obtain a geopolymer resin having a Na:Al:Si atomic ratio of about 3:1:2.

The geopolymer resin was heated in an oven under conditions of atmospheric pressure and 70° C. for one day to obtain a geopolymer resin of about pH 14. The heat-treated geopolymer resin was washed by adding a sufficient amount of triple distilled water thereto, and centrifuged at 10,000 rpm for 5 minutes, followed by decantation of a clear supernatant of about pH 14. These washing, centrifugation, and decantation processes were repeated until pH of the supernatant reached about 7.

The neutralized geopolymer resin was dried in a vacuum oven at 80° C. overnight to obtain a final product of porous aluminosilicate. Physical properties of the final product were measured and are shown in the following Tables 1 and 2.

Example 2

3.02 g of NaOH was introduced into a reactor, and then 5.43 g of triple distilled water was added thereto and mixed well. To this solution, 7.76 g of sodium silicate (~10.6% Na$_2$O, ~26.5% SiO$_2$) was added and completely dissolved under stirring at 800 rpm at room temperature. To this prepared solution, 3.8 g of metakaolin was added and stirred at 800 rpm at room temperature for 40 minutes to obtain a geopolymer resin having a Na:Al:Si atomic ratio of about 3:1:2.

The geopolymer resin was heated in an oven under conditions of atmospheric pressure and 70° C. for one day to obtain a geopolymer resin of about pH 14. The heat-treated geopolymer resin was washed by adding a sufficient amount of a 7% nitric acid aqueous solution thereto, and centrifuged at 10,000 rpm for 5 minutes, followed by decantation of a clear supernatant of about pH 14. These washing, centrifugation, and decantation processes were repeated until pH of the supernatant reached about 7.

The neutralized geopolymer resin was dried in a vacuum oven at 80° C. overnight to obtain a final product of porous aluminosilicate.

Comparative Example 1

Porous aluminosilicate was obtained in the same manner as in Example 1, except that 4.88 g of triple distilled water was further added (that is, a total of 10.31 g of triple distilled water was added) in the process of obtaining the geopolymer resin.

Comparative Example 2

Zeolite 13X, which is a product of Sigma-Aldrich, was obtained.

TABLE 1

|  | Example 1 | Example 2 | Comparative Example 1 | Comparative Example 2 |
|---|---|---|---|---|
| BET (m$^2$/g) | 519 | 371 | 558 | 787 |
| ESA (m$^2$/g) | 210 | 206 | 117 | 12 |
| A$_{micro}$ (m$^2$/g) | 309 | 165 | 441 | 775 |
| Pore width (nm) | 8.18 | 9.29 | 4.28 | 2.89 |
| V$_{total}$ (cm$^3$/g) | 0.72 | 0.61 | 0.32 | 0.30 |
| V$_{meso}$ (cm$^3$/g) | 0.59 | 0.50 | 0.16 | 0.02 |
| V$_{micro}$ (cm$^3$/g) | 0.13 | 0.11 | 0.16 | 0.28 |
| V$_{meso/micro}$ | 4.54 | 4.55 | 1.00 | 0.71 |

BET (m$^2$/g): Brunauer-Emmett-Teller (BET) surface area
ESA (m$^2$/g): External specific surface area
A$_{micro}$ (m$^2$/g): Surface area of a micropore having a pore size of less than 2 nm
Pore width (nm): Barrett-Joyner-Halenda (BJH) desorption average pore width
V$_{total}$ (cm$^3$/g): Total pore volume
V$_{meso}$ (cm$^3$/g): Barrett-Joyner-Halenda (BJH) cumulative volume of a mesopore having a pore size of 2 nm to 300 nm
V$_{micro}$ (cm$^3$/g): Volume of a micropore having a pore size of less than 2 nm, as calculated from argon adsorption Brunauer-Emmett-Teller (BET) surface area by the t-plot method.

TABLE 2

| Water absorption rate (wt %) | Example 1 | Example 2 | Comparative Example 1 | Comparative Example 2 |
|---|---|---|---|---|
| @ 25° C., 70% RH | 17.42 | 14.67 | 12.19 | 19.43 |
| @ 25° C., 80% RH | 21.07 | 18.80 | 13.65 | 19.76 |

TABLE 2-continued

| Water absorption rate (wt %) | Example 1 | Example 2 | Comparative Example 1 | Comparative Example 2 |
|---|---|---|---|---|
| @ 25° C., 90% RH | 25.59 | 24.56 | 14.94 | 20.13 |
| @ 25° C., 95% RH | 30.41 | 30.69 | 16.39 | 20.54 |

Referring to Tables 1 and 2, the porous aluminosilicates according to Examples 1 and 2 had a large external specific surface area (ESA) and a BJH desorption average pore width, while the mesopore volume was about 4.5 times greater than the micropore volume. Therefore, it was confirmed that the porous aluminosilicates according to Examples 1 and 2 exhibited a high water absorption rate of up to 30% by weight under relative humidity of 80% or higher, thereby being suitably used as a core material for a vacuum insulation panel.

In contrast, the porous aluminosilicates according to Comparative Examples 1 and 2 had a relatively small external specific surface area, BJH desorption average pore width, mesopore volume, etc., and therefore they had a remarkably low water absorption rate.

REFERENCE NUMERALS

100: Vacuum insulation panel
110: Outer shell material
120: Core material

The invention claimed is:

1. A core material for a vacuum insulation panel, comprising porous aluminosilicate having an argon adsorption Brunauer-Emmett-Teller (BET) surface area of 300 m$^2$/g or more and an external specific surface area (ESA) of 150 m$^2$/g or more,
wherein the porous aluminosilicate has pores satisfying the following Equation 1:

$$V_{meso}/V_{micro} > 3.0 \qquad [\text{Equation 1}]$$

wherein V$_{meso}$ represents a Barrett-Joyner-Halenda (BJH) cumulative volume of a mesopore having a pore size of 2 nm to 300 nm, and
V$_{micro}$ represents a volume of a micropore having a pore size of less than 2 nm, as calculated from argon adsorption Brunauer-Emmett-Teller (BET) surface area by the t-plot method.

2. The core material for the vacuum insulation panel of claim 1, wherein the porous aluminosilicate has a Barrett-Joyner-Halenda (BJH) desorption average pore width of 5 nm to 15 nm.

3. The core material for the vacuum insulation panel of claim 1, wherein the porous aluminosilicate has a water absorption rate of 18% by weight or more, 22% by weight, or more, and 25% by weight or more, when humidified at a relative humidity of 80%, 90%, and 95% , respectively, under an isothermal condition of 25° C.

4. A vacuum insulation panel, comprising:
the core material of claim 1; and
an outer shell material sealing and covering the core material.

* * * * *